(12) United States Patent
Burdette et al.

(10) Patent No.: US 11,530,614 B2
(45) Date of Patent: Dec. 20, 2022

(54) VANE ARC SEGMENT FORMED OF FIBER-REINFORCED COMPOSITE

(71) Applicant: RAYTHEON TECHNOLOGIES CORPORATION, Farmington, CT (US)

(72) Inventors: Alyson T. Burdette, Gilbertsville, PA (US); Bryan P. Dube, Columbia, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 17/480,511

(22) Filed: Sep. 21, 2021

(65) Prior Publication Data
US 2022/0268165 A1 Aug. 25, 2022

Related U.S. Application Data (60) Provisional application No. 63/151,616, filed on Feb. 19, 2021.

(51) Int. Cl.
*F01D 9/04* (2006.01)

(52) U.S. Cl.
CPC .......... *F01D 9/041* (2013.01); *F05D 2220/32* (2013.01); *F05D 2240/10* (2013.01)

(58) Field of Classification Search
CPC ...... F01D 9/041; F01D 5/282; F05D 2220/32; F05D 2240/10; F05D 2230/50;

(Continued)

(56) References Cited

U.S. PATENT DOCUMENTS 8,926,262 B2 * 1/2015 Tanahashi ............... F01D 5/282
 416/241 B
9,427,834 B2 8/2016 Fremont et al.
(Continued)

FOREIGN PATENT DOCUMENTS

EP 3650653 5/2020
EP 3744949 12/2020

OTHER PUBLICATIONS

European Search Report for European Patent Application No. 22152472.1 dated Jul. 26, 2022.

*Primary Examiner* — Jesse S Bogue
(74) *Attorney, Agent, or Firm* — Carlson, Gaskey & Olds, P.C.

(57) ABSTRACT

A vane arc segment includes an airfoil fairing that has a fairing platform and a hollow airfoil section that extends there from. The hollow airfoil section defines an airfoil profile and surrounds an internal cavity. The fairing platform defines a gaspath side and a non-gaspath side. The airfoil fairing is formed of a fiber-reinforced composite comprised of fiber plies. The fiber plies include at least one cavity fiber ply that is arranged as a tube that circumscribes the internal cavity. The at least one cavity fiber ply extends through the fairing platform and defines at least a portion of an upstanding collar on the non-gaspath side of the fairing platform. The upstanding collar defines a collar profile. The tube necks down through a neck portion such that at least a portion of the collar profile is narrower than the airfoil profile.

17 Claims, 6 Drawing Sheets

(58) Field of Classification Search
CPC ......... F05D 2300/603; F05D 2300/614; F05D 2300/6034; F02C 3/04
See application file for complete search history.

(56) References Cited

U.S. PATENT DOCUMENTS

| | | |
|---|---|---|
| 10,612,399 B2 | 4/2020 | Freeman et al. |
| 10,655,482 B2 * | 5/2020 | Freeman ................ F01D 9/041 |
| 10,859,268 B2 | 12/2020 | Whittle |
| 11,346,228 B1 * | 5/2022 | Burdette ................ D03D 11/02 |
| 2013/0004296 A1 * | 1/2013 | Propheter-Hinckley ................... F01D 5/284 415/115 |
| 2013/0011271 A1 * | 1/2013 | Shi ............................ F01D 5/28 416/230 |
| 2016/0230568 A1 * | 8/2016 | Sippel ..................... B32B 18/00 |
| 2017/0022828 A1 * | 1/2017 | Heitman ................ F01D 9/042 |
| 2018/0119549 A1 * | 5/2018 | Vetters ................... F01D 5/147 |
| 2019/0338660 A1 * | 11/2019 | Underwood ............ F01D 9/041 |
| 2019/0368363 A1 * | 12/2019 | Walston ................ F01D 25/005 |
| 2020/0088050 A1 | 3/2020 | Whittle et al. |
| 2020/0109858 A1 * | 4/2020 | Whittle .................... F23R 3/16 |
| 2020/0248569 A1 | 8/2020 | Whittle et al. |
| 2020/0378267 A1 * | 12/2020 | Shinavski ............... F01D 5/284 |
| 2020/0392049 A1 | 12/2020 | Razzell et al. |
| 2021/0156270 A1 * | 5/2021 | Burdette ................ F01D 9/065 |
| 2021/0156271 A1 * | 5/2021 | Burdette ................ F01D 9/041 |

* cited by examiner

VANE ARC SEGMENT FORMED OF FIBER-REINFORCED COMPOSITE

CROSS-REFERENCE TO RELATED APPLICATION

The present disclosure claims priority to U.S. Provisional Application No. 63/151,616 filed Feb. 19, 2021.

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section may include low and high pressure compressors, and the turbine section may also include low and high pressure turbines.

Airfoils in the turbine section are typically formed of a superalloy and may include thermal barrier coatings to extend temperature capability and lifetime. Ceramic matrix composite ("CMC") materials are also being considered for airfoils. Among other attractive properties, CMCs have high temperature resistance. Despite this attribute, however, there are unique challenges to implementing CMCs in airfoils.

SUMMARY

A vane arc segment according to an example of the present disclosure includes an airfoil fairing having a fairing platform and a hollow airfoil section extending there from. The hollow airfoil section defines an airfoil profile and surrounds an internal cavity. The fairing platform defines a gaspath side and a non-gaspath side. The airfoil fairing is formed of a fiber-reinforced composite comprised of fiber plies. The fiber plies include at least one cavity fiber ply that is arranged as a tube that circumscribes the internal cavity. The at least one cavity fiber ply extends through the fairing platform and defines at least a portion of an upstanding collar on the non-gaspath side of the fairing platform. The upstanding collar defines a collar profile. The tube necks down through a neck portion such that at least a portion of the collar profile is narrower than the airfoil profile.

In a further embodiment of any of the foregoing embodiments, the at least one cavity fiber ply in the neck portion is sloped at an angle of at least 15 degrees relative to the at least one cavity fiber ply in the upstanding collar.

In a further embodiment of any of the foregoing embodiments, the at least one cavity fiber ply includes inner and outer cavity fiber plies, and further includes a noodle interposed between the inner and outer cavity fiber plies.

In a further embodiment of any of the foregoing embodiments, the noodle includes a curved finger that extends in the neck portion between the inner and outer cavity fiber plies.

A further embodiment of any of the foregoing embodiments includes a support noodle abutting the outer cavity fiber ply at the neck portion.

In a further embodiment of any of the foregoing embodiments, the fiber plies include at least one over-layer ply that extends from the airfoil section and turns into the fairing platform. The support noodle abuts the at least one over-layer ply at a location where the at least one over-layer ply turns.

In a further embodiment of any of the foregoing embodiments, the fiber plies include cover plies that extend into the fairing platform and turn into the upstanding collar adjacent the at least one cavity fiber ply.

In a further embodiment of any of the foregoing embodiments, the support noodle extends around the airfoil section and has a variable cross-sectional geometry.

In a further embodiment of any of the foregoing embodiments, the fiber plies include cover plies that extend into the fairing platform and turn into the upstanding collar adjacent the at least one cavity fiber ply.

A gas turbine engine according to an example of the present disclosure includes a compressor section, a combustor in fluid communication with the compressor section, and a turbine section in fluid communication with the combustor. The turbine section has vane arc segments disposed about a central axis of the gas turbine engine. Each of the vane arc segments includes an airfoil fairing having a fairing platform and a hollow airfoil section extending there from. The hollow airfoil section defines an airfoil profile and surrounds an internal cavity. The fairing platform defines a gaspath side and a non-gaspath side. The airfoil fairing is formed of a fiber-reinforced composite comprised of fiber plies. The fiber plies include at least one cavity fiber ply that is arranged as a tube that circumscribes the internal cavity. The at least one cavity fiber ply extends through the fairing platform and defines at least a portion of an upstanding collar on the non-gaspath side of the fairing platform. The upstanding collar defines a collar profile. The tube necks down through a neck portion such that at least a portion of the collar profile is narrower than the airfoil profile.

In a further embodiment of any of the foregoing embodiments, the at least one cavity fiber ply in the neck portion is sloped at an angle of at least 15 degrees relative to the at least one cavity fiber ply in the upstanding collar.

In a further embodiment of any of the foregoing embodiments, the at least one cavity fiber ply includes inner and outer cavity fiber plies, and further includes a noodle interposed between the inner and outer cavity fiber plies.

In a further embodiment of any of the foregoing embodiments, the noodle includes a curved finger that extends in the neck portion between the inner and outer cavity fiber plies.

A further embodiment of any of the foregoing embodiments includes a support noodle abutting the outer cavity fiber ply at the neck portion.

In a further embodiment of any of the foregoing embodiments, the fiber plies include at least one over-layer ply that extends from the airfoil section and turns into the fairing platform. The support noodle abuts the at least one over-layer ply at a location where the at least one over-layer ply turns.

In a further embodiment of any of the foregoing embodiments, the fiber plies include cover plies that extend in the fairing platform and turn into the upstanding collar adjacent the at least one cavity fiber ply.

In a further embodiment of any of the foregoing embodiments, the support noodle extends around the airfoil section and has a variable cross-sectional geometry.

A method of fabricating an airfoil fairing for a vane arc segment according to an example of the present disclosure includes providing a mandrel that necks down through a mandrel neck portion, and providing fiber plies around the mandrel to form a tube that defines at least a portion of an airfoil profile of an airfoil section of an airfoil fairing. The fiber plies follow the mandrel neck portion such that the tube has a corresponding tube neck portion that necks down to a collar. After forming, the mandrel is then removed from the tube.

In a further embodiment of any of the foregoing embodiments, the mandrel is tapered.

A further embodiment of any of the foregoing embodiments includes consolidating the fiber plies with a matrix material.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
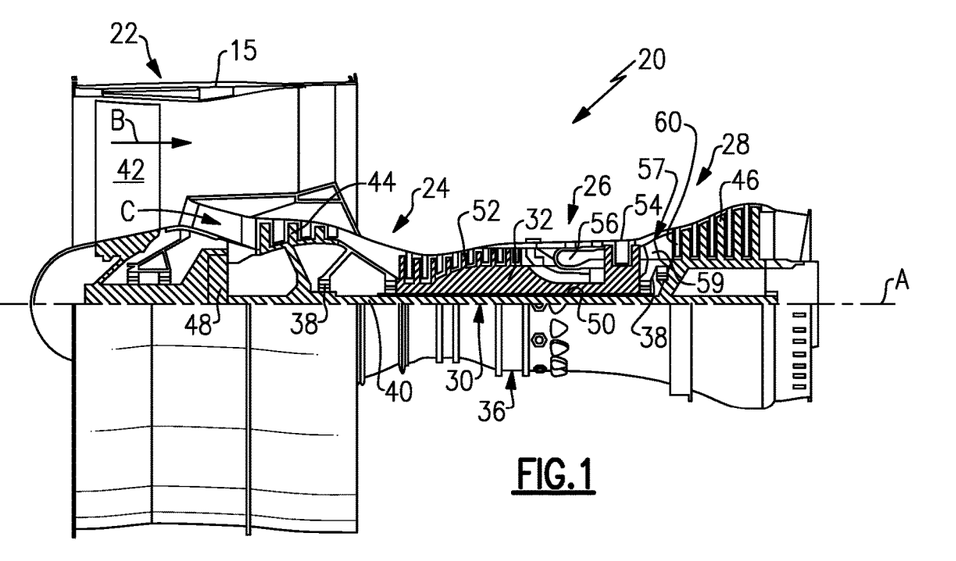
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]$^{0.5}$. The "Low corrected fan tip speed" as disclosed herein according to one non-limiting embodiment is less than about 1150 ft/second (350.5 meters/second).

Figure 2A:
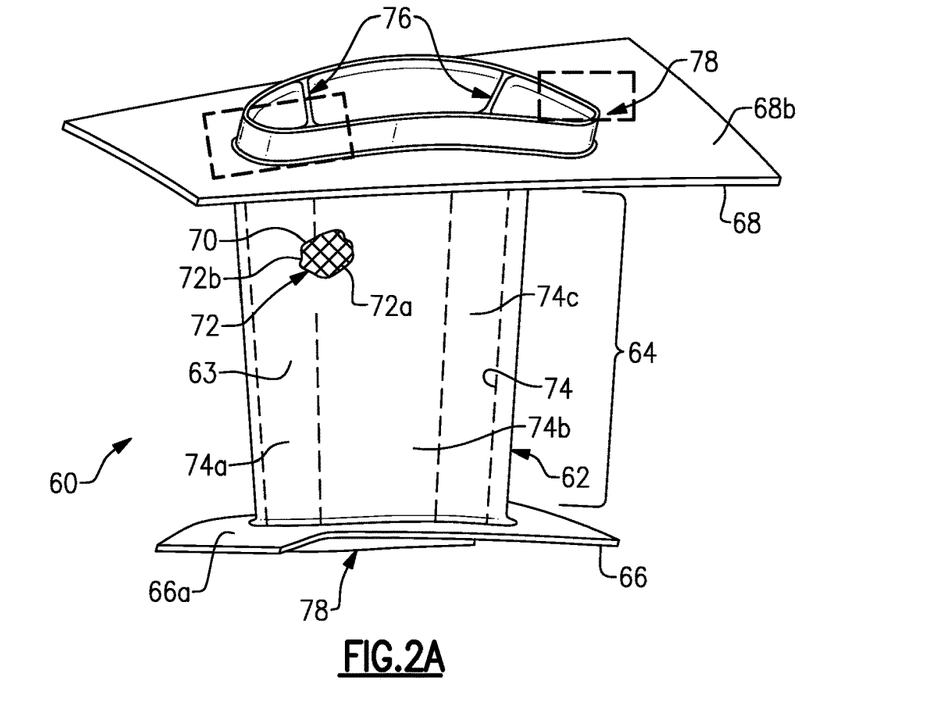
FIG. 2A illustrates a view of an airfoil fairing.
Figure 2B:
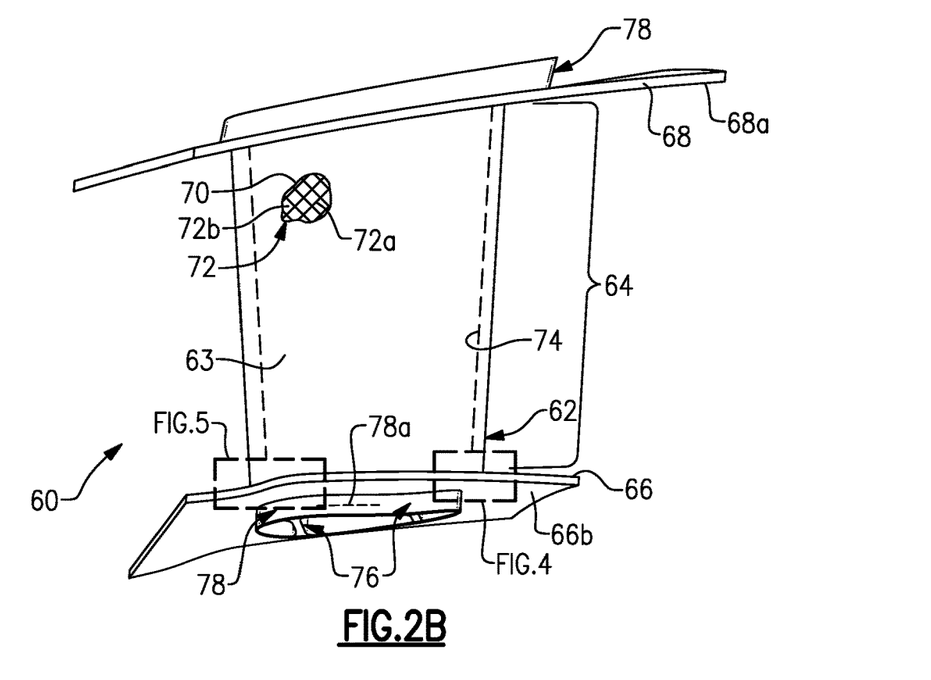
FIG. 2B illustrates another view of the airfoil fairing.

FIGS. 2A and 2B illustrate views of an example of a portion of a vane arc segment 60 from the turbine section 28 of the engine 20 (see also FIG. 1). It is to be understood that although the examples herein are discussed in context of a vane from the turbine section, the examples can be applied to vanes in other portions of the engine 20.

The vane arc segment 60 includes an airfoil fairing 62 that is formed by an airfoil wall 63. The airfoil fairing 62 is comprised of a hollow airfoil section 64 and first and second platforms 66/68 between which the airfoil section 64 extends. The airfoil section 64 generally extends in a radial direction relative to the central engine axis A. The terms such as "inner" and "outer" refer to location with respect to the central engine axis A, i.e., radially inner or radially outer. In the illustrated example, the first platform 66 is an inner platform and the second platform 68 is an outer platform. It is to be understood that although the illustrated airfoil fairing 62 has two platforms 66/68, the airfoil fairing 62 may alternatively have only a single platform 66 or 68 and the other platform may be provided as a separate piece. Moreover, the terminology "first" and "second" as used herein is to differentiate that there are two architecturally distinct components or features; and the terms "first" and "second" are interchangeable in the embodiments herein in that a first component or feature could alternatively be termed as the second component or feature, and vice versa.

The airfoil fairing 62 is fabricated of a fiber-reinforced composite 70 (shown in partial cutaway view in FIGS. 2A and 2B). The fiber-reinforced composite 70 is comprised of fiber plies 72, and each fiber ply 72 is comprised of a network of fiber tows 72a disposed in a matrix 72b. A fiber tow is a bundle of filaments. As an example, a single tow may have several thousand filaments. The tows 72a may be arranged in a fiber architecture, which refers to an ordered arrangement of the tows 72a relative to one another, such as a 2D woven ply or a 3D structure. For instance, the fiber plies 72 are 2D woven plies, such as but not limited to, harness satin weave plies (e.g., 8 harness satin weave), braided plies (e.g., bi- or tri-axial braid), or a combination plies of differing architectures (e.g., some 8 harness satin weave, some tri-axial braid).

The fiber-reinforced composite 70 is a ceramic matrix composite, an organic matrix composite (OMC), or a metal matrix composite (MMC). For instance, the ceramic matrix composite (CMC) is formed of ceramic fiber tows that are disposed in a ceramic matrix. The ceramic matrix composite may be, but is not limited to, a SiC/SiC ceramic matrix composite in which SiC fiber tows are disposed within a SiC matrix. Example organic matrix composites include, but are not limited to, glass fiber tows, carbon fiber tows, and/or aramid fiber tows disposed in a polymer matrix, such as epoxy. Example metal matrix composites include, but are not limited to, boron carbide fiber tows and/or alumina fiber tows disposed in a metal matrix, such as aluminum.

The airfoil section 64 circumscribes an interior cavity 74, which in this example is subdivided by ribs 76 into cavities 74a/74b/74c. The cavity 74a is a forward cavity, the cavity 74c is an aft cavity, and the cavity 74b is an intermediate cavity. Alternatively, the airfoil section 64 may have a single cavity 74, or the cavity 74 may be further divided by additional or fewer ribs.

Each of the platforms 66/68 defines a respective gaspath side 66a/68a and a non-gaspath side 66b/68b. The gaspath side 66a/68a here refers to the core gaspath of the engine 20. The non-gaspath side 66b/68b of at least one of the platforms 66/68 includes an upstanding collar 78. As will be discussed further below, the collar 78 defines a collar profile 78a. In the illustrated example, both of the platforms 66/68 have collars 78, but it is to be understood that one or the other of the platforms 66/68 may exclude the collar 78 and instead have a different attachment feature than the collar 78. The collar 78 serves to mount the airfoil fairing 62 in the engine 20. For instance, the collar 78 engages with a corresponding mating feature in support hardware (not shown) to support the airfoil fairing 62. Aerodynamic, thermal, and structural loads may be reacted through the collar 78 to the support hardware.

The use of fiber-reinforced composites in an airfoil fairing presents challenges for attachment in a gas turbine engine. In an airfoil that is formed of a metallic superalloy, the superalloy is strong and can be cast with relatively complex geometry attachment features. Fiber-reinforced composites such as CMCs, however, have lower material stress limits in comparison to high strength superalloys used for some vane segments. Thus, support schemes designed for metal alloys that utilize hooks or a series of rails can concentrate stresses and/or create thermal stresses which may exceed material limits if made of composite material. Moreover, hooks and rails often have complex geometries that are challenging to manufacture of composite material. Therefore, even though composites may have many potential benefits, such benefits cannot be realized without a suitable support scheme. In this regard, as will be described further below, the collar or collars 78 facilitate good strength and manufacturability while serving as a relatively simple attachment feature.

Figure 3:
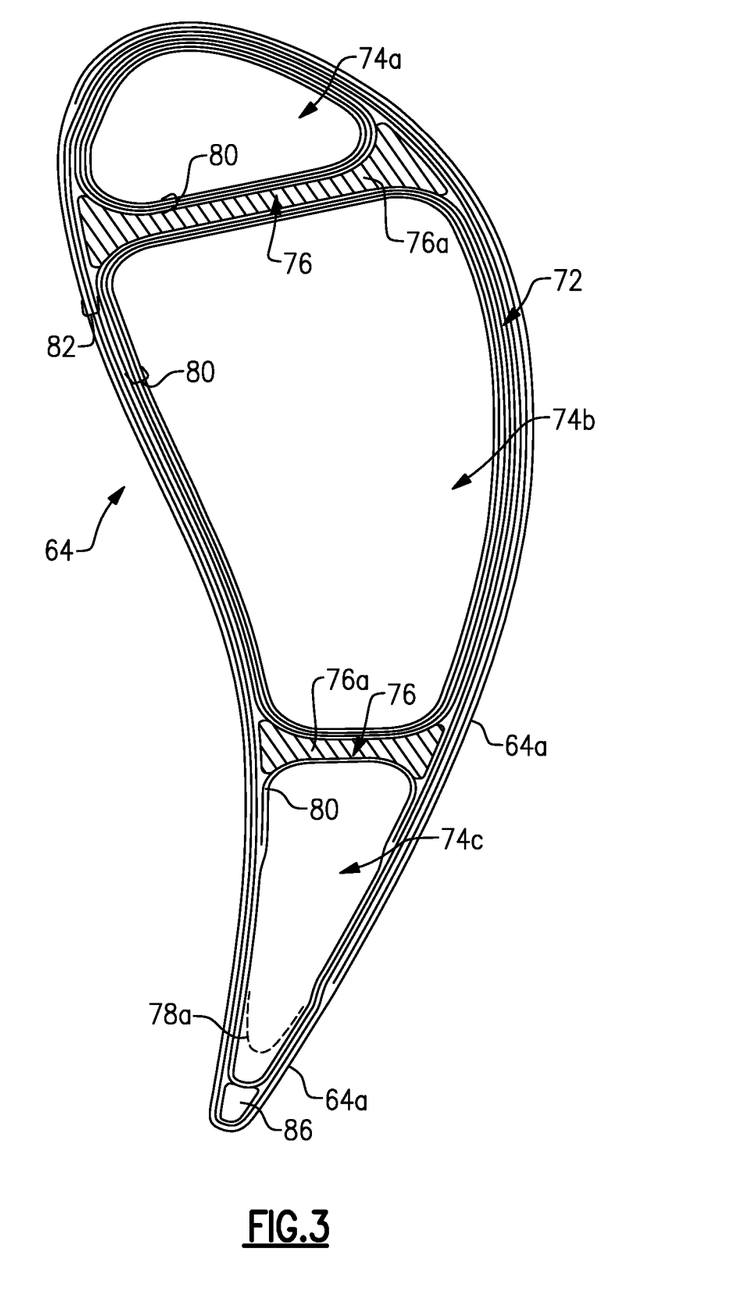
FIG. 3 illustrates a sectioned view through the airfoil fairing.

FIG. 3 illustrates a sectioned view through the airfoil section 64 of the fairing 62 that shows the layered fiber ply architecture of the fiber plies 72 of the fiber-reinforced composite 70. As will be discussed further below, the airfoil section 64 defines an airfoil profile 64a. In this example, the fiber plies 72 include cavity fiber plies 80 and over-layer plies 82. The cavity fiber plies 80 are arranged as a tube. In this example, since there are three cavities 74a/74b/74c, there are three sets of cavity fiber plies 80 that form three tubes. Alternatively, if there were two cavities, there would be two sets of cavity fiber plies 80, or if there were only a single cavity there would be only a single set of cavity fiber plies 80. Each set of cavity fiber plies 80 has at least one cavity fiber ply 80. Thus, although the tubes here are shown with three plies (for cavities 74a/74b) and one ply (cavity 74c), additional or fewer plies may be provided for strength and/or wall thickness considerations. The ribs 76 in this example are formed by inserts 76a that separate the tubes and reinforce the airfoil section 64. The inserts 76a, however, may be excluded or substituted by other types of reinforcement.

Figure 4:
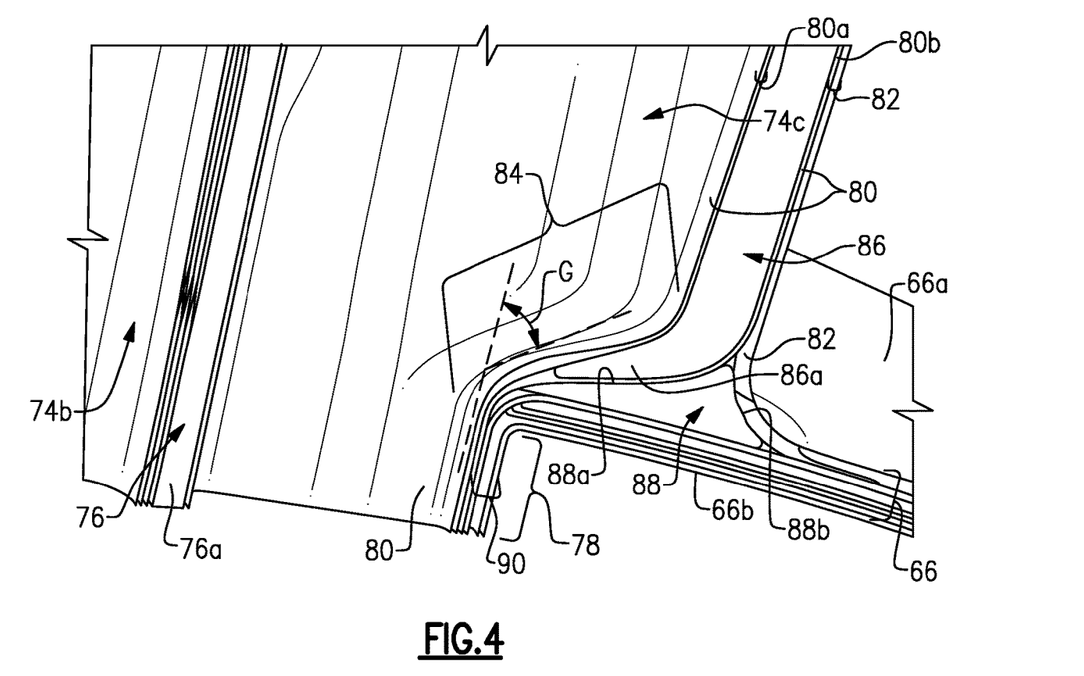
FIG. 4 illustrates a fiber ply architecture and transition from an airfoil section to an upstanding collar (trailing end inner diameter region).

FIG. 4 illustrates a sectioned view through the airfoil fairing 62 in a trailing inner diameter region (see location FIG. 2B). As shown, one or more of the cavity fiber plies 80 extends through the fairing platform 66 and defines at least a portion of the collar 78 on the non-gaspath side 66b of the platform 66. In this case, however, the space available for the collar 78 is somewhat smaller than the airfoil profile 64a. If the tube formed by the cavity fiber plies 80 were to extend straight or substantially straight through the fairing platform 66, the collar profile 78a would be equal or substantially equal to the airfoil profile 64a. The collar 78, therefore, would be over-sized for the allotted space.

In order to reduce the size of the collar profile 78a, the tube formed by the cavity fiber plies 80 necks down (narrows) through a neck portion 84 of the tube. Thus, when the cavity fiber plies 80 extend through the platform 66, the collar 78 is offset such that at least a portion of the collar profile 78a is narrower than the airfoil profile 64a (see also FIG. 3 in which the profiles 78a/64a are superimposed at the trailing end of the airfoil section 64). As will be appreciated, since the cavity fiber plies 80 in the illustrated example form the tube for the aft cavity 74c, it is the trailing end region of the collar 78 that is narrower. It is to be understood, however, that portions of the tubes for the cavities 74a/74b could additionally or alternatively be necked down so that the collar profile 78a is narrowed in other locations in addition to or instead of at the trailing end region. It is also to be appreciated that although the necking in FIG. 4 is shown for the inner diameter collar 78 of the airfoil fairing 62, that the cavity fiber plies 80 for the outer diameter collar 78 may additionally or alternatively neck down.

The slope angle of the cavity fiber plies 80 in the neck portion 84 may be varied for more or less necking of the tube. In general, however, the cavity fiber ply or plies 80 in the neck portion 84 slope at an angle of at least 15 degrees relative to the cavity fiber ply 80 in the collar 78, as represented at angle G in FIG. 4. In further examples, the cavity fiber ply or plies 80 in the neck portion 84 slope at an angle of up to about 75 degrees relative to the cavity fiber ply 80 in the collar 78. For curved surfaces, the angle G is taken with regard to a tangent line on the curve.

As also shown in FIG. 4, the cavity fiber plies 80 in this example have one or more inner plies 80a and one or more outer plies 80b. In this instance, "inner" and "outer" are made with reference to the inside of the tube formed by the cavity fiber plies 80. As shown, there is a noodle 86 interposed between the inner and outer plies 80a/80b. A "noodle region" is a void region between fiber plies, and a "noodle" is a filler that takes up the void and may be formed of the matrix material (without fibers) or other space-filler that typically does not provide structural reinforcement or provides substantially less structural reinforcement than the subject cavity fiber plies 80.

The noodle 86 is generally elongated along the trailing end of the airfoil section 64 and adds thickness to the airfoil section 64 in the trailing end region. Near the platform 66, the noodle 86 includes a curved finger 86a that extends in the neck portion 84 between the inner and outer plies 80a/80b. The curved finger 86a facilitates establishing the slope angle G of the neck portion 84 and supporting the cavity fiber plies 80 in the neck portion 84. The outer ply or plies 80b generally follow the curved finger 86a of the noodle 86 and slope toward the collar 78 before interfacially merging with the inner plies 80a at the collar 78.

As also shown, there is a support noodle 88 that abuts the outer ply 80b at the neck portion 84 along the curved finger 86a. A first face 88a of the support noodle 88 generally tracks the curved finger 86a. A second face 88b slopes away from the first face 88a. In this example, the over-layer plies 82 extend from the airfoil section 64 and turn into the fairing platform 66. The second face 88b of the support noodle 88 abuts the innermost over-layer ply 82 at the location where the over-layer ply 82 turns, thereby providing a fillet region of the airfoil section 64.

As further shown in FIG. 4, the fiber plies 72 include cover plies 90. At least one of the cover plies 90 extends in the platform 66 and turns into the collar 78 adjacent the cavity fiber plies 80. The cover fiber plies 90 facilitate stiffening and strengthening of the collar 78, as well as adding thickness to the collar 78. It is to be appreciated that although the neck portion 84 in in the illustrated example is in the inner diameter trailing end region of the airfoil fairing 62, that the fairing 62 may additionally or alternatively include neck portions in other locations.

Figure 5:
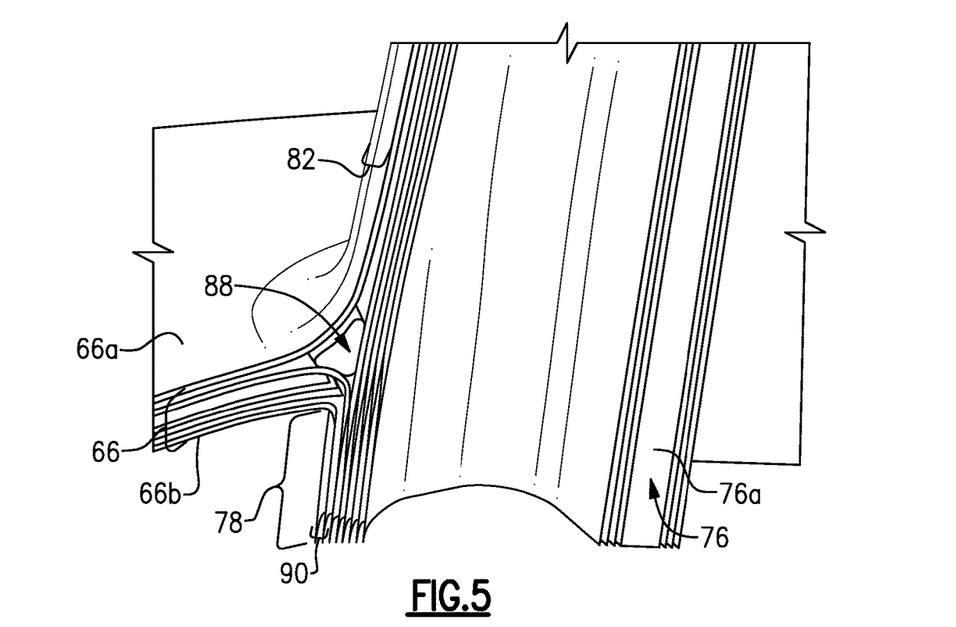
FIG. 5 illustrates a fiber ply architecture and transition from an airfoil section to an upstanding collar (leading end inner diameter region).

FIG. 5 illustrates a sectioned view through the airfoil fairing 62 in a leading inner diameter region (see location FIG. 2B). In this location, the tube provided by the cover fiber plies 80 (that form cavity 74a) extend substantially straight through the platform 66 to form the collar 78. Thus, the aforementioned collar profile 78a substantially follows the airfoil profile 64a in this location. Also shown is a leading end portion of the support noodle 88. The support noodle 88 wraps around the airfoil section 64 and facilitates formation of a fillet region at the leading edge of the airfoil section 64. As will be appreciated, however, the cross-sectional geometry of the support noodle 88 in this location is different than at the trailing end (FIG. 4). That is, the support noodle 88 has a variable cross-sectional geometry that changes along its length between the leading and trailing regions of the airfoil section 64. The noodle 86 is located only in the trailing end region. Therefore, there is no need for the relatively broad profile of the support noodle 88 in the leading end region as there is in the trailing end region. The support noodle 88 thus decreases in cross-sectional area along its length from the trailing end region to the leading end region, where it mainly serves as a filler in the radius region between the cavity fiber plies 80, the over-layer plies 82, and the cover plies 90 in the platform 66.

Figure 6:
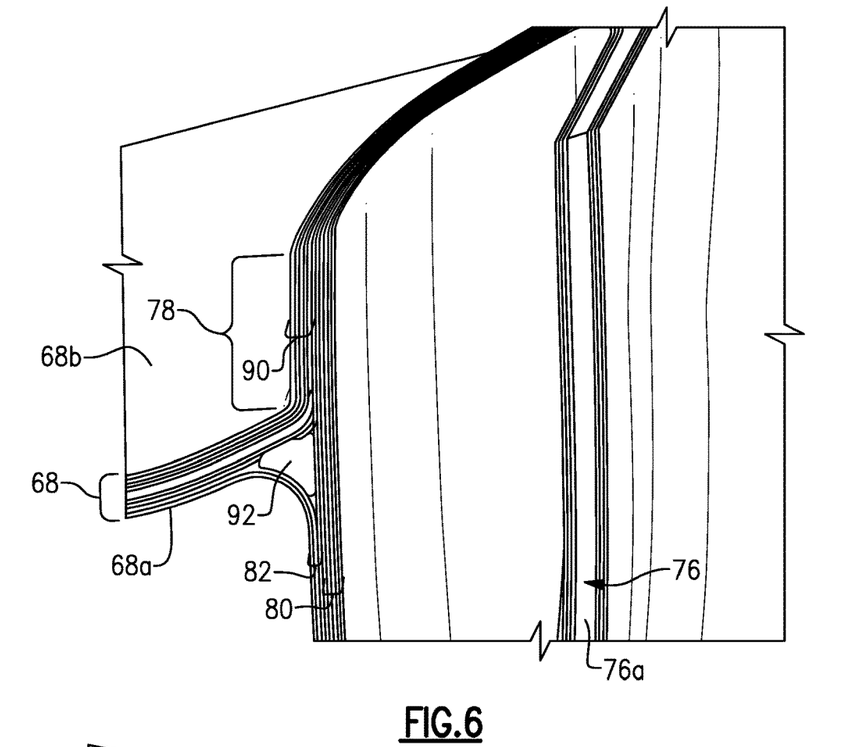
FIG. 6 illustrates a fiber ply architecture and transition from an airfoil section to an upstanding collar (leading end outer diameter region).

FIG. 6 illustrates a sectioned view through the airfoil fairing 62 in a leading outer diameter region (see location FIG. 2B). In this example, similar to the leading end inner diameter region (FIG. 5), the tube provided by the cover fiber plies 80 (that form cavity 74a) extend substantially straight through the platform 68 to form the (outer) collar 78. Thus, the collar profile of the collar 78 of the platform 68 substantially follows the airfoil profile 64a in this location. There is an additional noodle 92 in the radius region between the cavity fiber plies 80, the over-layer plies 82, and the cover plies 90 in the platform 68.

Figure 7:
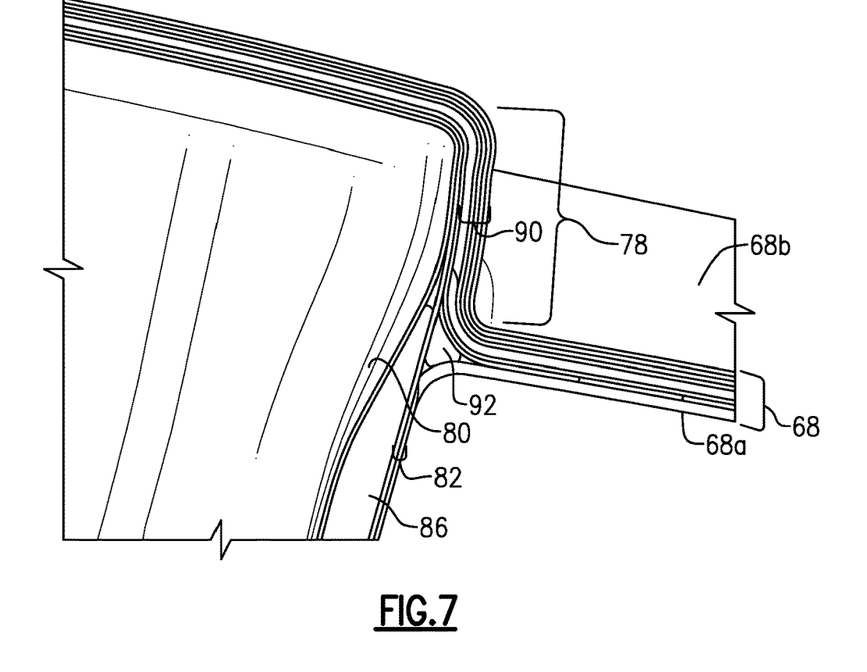
FIG. 7 illustrates a fiber ply architecture and transition from an airfoil section to an upstanding collar (trailing end outer diameter region).

FIG. 7 illustrates a sectioned view through the airfoil fairing 62 in a trailing outer diameter region (see location FIG. 2B). In this example, the tube provided by the cover fiber plies 80 (that form cavity 74c) diverges through the platform 68 where the noodle 86 terminates to thereby form the (outer) collar 78.

As can be appreciated from the examples disclosed herein, the collars 78 are of relatively simple geometry that can be readily formed with upstanding fiber plies and additional fiber plies as necessary for reinforcement and sizing. Furthermore, the necking down of the cavity fiber plies 80 permits the collar 78 to be smaller in profile than the airfoil section 64, thereby reducing the amount of space used. Moreover, the collars 78 can be formed with any of a variety of different architectures in order to tailor the collar 78 to the particular implementation and, if necessary, provide collars 78 of different architectures on the same airfoil fairing.

Figure 8A:
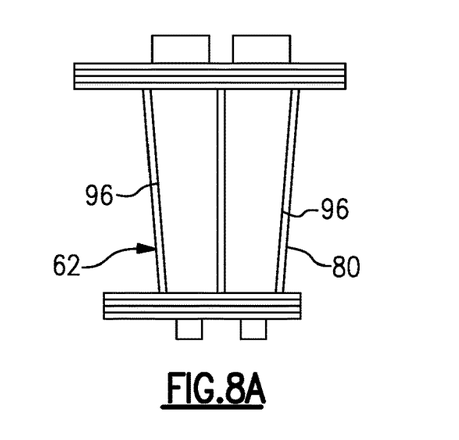
FIG. 8A illustrates an example method of fabricating an airfoil fairing using tapered mandrels.
Figure 8B:
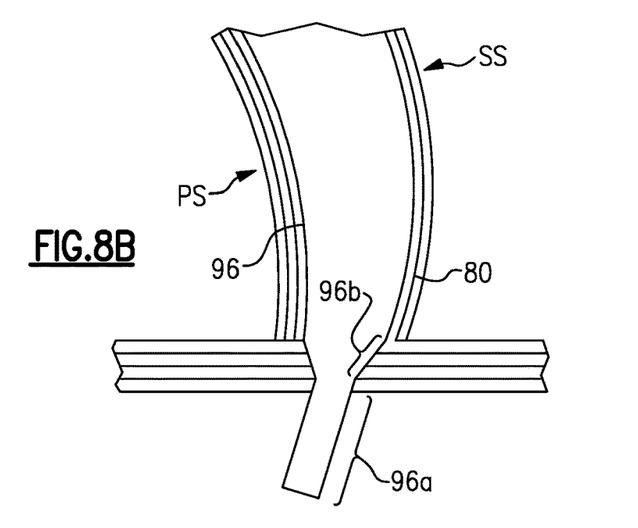
FIG. 8B illustrates an example method in which the mandrels are bowed.
Figure 8C:
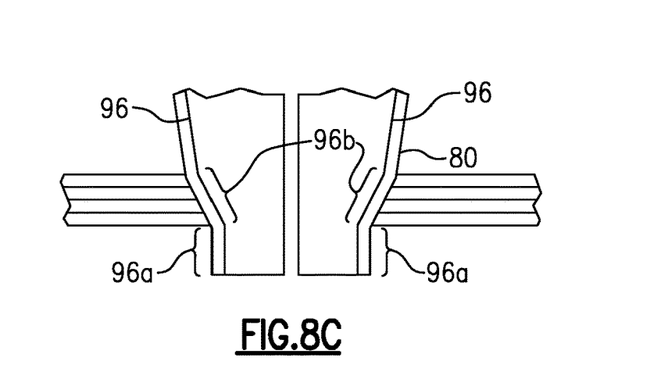
FIG. 8C illustrates the example method in which the mandrels have a neck portion in order to form a neck portion in the airfoil fairing.

FIGS. 8A, 8B, and 8C illustrate selected portions of the airfoil fairing 62 during a fabrication process. As shown, the cavity fiber plies 80 are laid-up around mandrels 96. In this example, the mandrels 96 generally taper from the outer diameter end (the top in FIG. 8A) to the root (the lower end in FIG. 8A). The taper facilitates removal of the mandrels 96 by sliding the mandrels from the airfoil fairing 62 once completely formed. For instance, the mandrels 96 have a taper of at least 2°, although steeper or shallower tapers may be used as long as the mandrels 96 can be removed without substantially damaging the airfoil fairing 62. The tip end portions 96a of the mandrels 96 may be straight to form the collar 78 with a straight profile. As shown in FIG. 8B, the mandrels 96 may also be bowed in order to form the airfoil fairing 62 with a bowed shape. However, the mandrels 96 will be straight if the airfoil fairing 62 is to be straight.

As shown in FIG. 8C, the mandrels 96 have respective neck portions 96b that correspond to the neck portions 84 that are formed in the airfoil fairing 62. For instance, the neck portions 96b taper at an angle of at least 5°. When the plies 80 are laid up over the neck portion 96a the plies 80 follow the shape of the neck portion 96a, thereby forming the neck portion 84 in the airfoil fairing 62. As will be appreciated, if the neck portion 84 were to be at the outer diameter of the airfoil fairing 62, the mandrel 96 would be inverted from the depicted orientation. After lay-up, the fiber plies are infiltrated with the matrix material, such as by chemical vapor infiltration or chemical vapor deposition, followed by removal of the mandrels 96.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A vane arc segment comprising:
   an airfoil fairing having a fairing platform and a hollow airfoil section extending there from, the hollow airfoil section defining an airfoil profile and surrounding an internal cavity, the fairing platform defining a gaspath side and a non-gaspath side,
   the airfoil fairing being formed of a fiber-reinforced composite comprised of fiber plies, the fiber plies including at least one cavity fiber ply that is arranged as a tube that circumscribes the internal cavity,
   the at least one cavity fiber ply extending through the fairing platform and defining at least a portion of an upstanding collar on the non-gaspath side of the fairing platform, the upstanding collar defining a collar profile, and
   the tube necking down through a neck portion such that at least a portion of the collar profile is narrower than the airfoil profile.

2. The vane arc segment as recited in claim 1, wherein the at least one cavity fiber ply in the neck portion is sloped at an angle of at least 15 degrees relative to the at least one cavity fiber ply in the upstanding collar.

3. The vane arc segment as recited in claim 1, wherein the at least one cavity fiber ply includes inner and outer cavity fiber plies, and further comprising a noodle interposed between the inner and outer cavity fiber plies.

4. The vane arc segment as recited in claim 3, wherein the noodle includes a curved finger that extends in the neck portion between the inner and outer cavity fiber plies.

5. The vane arc segment as recited in claim 4, further comprising a support noodle abutting the outer cavity fiber ply at the neck portion.

6. The vane arc segment as recited in claim 5, wherein the fiber plies include at least one over-layer ply that extends from the airfoil section and turns into the fairing platform, the support noodle abutting the at least one over-layer ply at a location where the at least one over-layer ply turns.

7. The vane arc segment as recited in claim 6, wherein the fiber plies include cover plies that extend into the fairing platform and turn into the upstanding collar adjacent the at least one cavity fiber ply.

8. The vane arc segment as recited in claim 5, wherein the support noodle extends around the airfoil section and has a variable cross-sectional geometry.

9. The vane arc segment as recited in claim 1, wherein the fiber plies include cover plies that extend into the fairing platform and turn into the upstanding collar adjacent the at least one cavity fiber ply.

10. A gas turbine engine comprising:
    a compressor section;
    a combustor in fluid communication with the compressor section; and
    a turbine section in fluid communication with the combustor, the turbine section having vane arc segments disposed about a central axis of the gas turbine engine, each of the vane arc segments includes
    an airfoil fairing having a fairing platform and a hollow airfoil section extending there from, the hollow airfoil section defining an airfoil profile and surrounding an internal cavity, the fairing platform defining a gaspath side and a non-gaspath side,
    the airfoil fairing being formed of a fiber-reinforced composite comprised of fiber plies, the fiber plies including at least one cavity fiber ply that is arranged as a tube that circumscribes the internal cavity,
    the at least one cavity fiber ply extending through the fairing platform and defining at least a portion of an upstanding collar on the non-gaspath side of the fairing platform, the upstanding collar defining a collar profile, and
    the tube necking down through a neck portion such that at least a portion of the collar profile is narrower than the airfoil profile.

11. The gas turbine engine as recited in claim 10, wherein the at least one cavity fiber ply in the neck portion is sloped at an angle of at least 15 degrees relative to the at least one cavity fiber ply in the upstanding collar.

12. The gas turbine engine as recited in claim 10, wherein the at least one cavity fiber ply includes inner and outer cavity fiber plies, and further comprising a noodle interposed between the inner and outer cavity fiber plies.

13. The gas turbine engine as recited in claim 12, wherein the noodle includes a curved finger that extends in the neck portion between the inner and outer cavity fiber plies.

14. The gas turbine engine as recited in claim 13, further comprising a support noodle abutting the outer cavity fiber ply at the neck portion.

15. The gas turbine engine as recited in claim 14, wherein the fiber plies include at least one over-layer ply that extends from the airfoil section and turns into the fairing platform, the support noodle abutting the at least one over-layer ply at a location where the at least one over-layer ply turns.

16. The gas turbine engine as recited in claim 15, wherein the fiber plies include cover plies that extend in the fairing platform and turn into the upstanding collar adjacent the at least one cavity fiber ply.

17. The gas turbine engine as recited in claim 14, wherein the support noodle extends around the airfoil section and has a variable cross-sectional geometry.

* * * * *